United States Patent
Zhao

(10) Patent No.: US 9,588,918 B2
(45) Date of Patent: Mar. 7, 2017

(54) STORAGE CONTROL DEVICES AND METHOD THEREFOR TO INVOKE ADDRESS THEREOF

(71) Applicants: INVENTEC (PUDONG) TECHNOLOGY CORPORATION, Shanghai (CN); INVENTEC CORPORATION, Taipei (TW)

(72) Inventor: Wei-Guo Zhao, Shanghai (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 201 days.

(21) Appl. No.: 14/522,871

(22) Filed: Oct. 24, 2014

(65) Prior Publication Data
US 2016/0062926 A1 Mar. 3, 2016

(30) Foreign Application Priority Data
Sep. 3, 2014 (CN) .......................... 2014 1 0444086

(51) Int. Cl.
*G06F 13/14* (2006.01)
*G06F 13/28* (2006.01)
*G06F 13/42* (2006.01)

(52) U.S. Cl.
CPC .......... *G06F 13/28* (2013.01); *G06F 13/4282* (2013.01)

(58) Field of Classification Search
None
See application file for complete search history.

(56) References Cited

U.S. PATENT DOCUMENTS

2012/0317324 A1* 12/2012 Aggarwal ........... G06F 13/4022
710/300
2012/0324137 A1* 12/2012 Jinno .................... G06F 3/0605
710/306
2014/0143447 A1* 5/2014 Wu ........................ G06F 3/0685
710/3

FOREIGN PATENT DOCUMENTS

CN 1584853 A 2/2005
CN 1719537 B 5/2010

* cited by examiner

*Primary Examiner* — Ilwoo Park
(74) *Attorney, Agent, or Firm* — Huffman Law Group, PC

(57) ABSTRACT

A storage control device comprises storage control and memory modules coupled with each other. The memory module keeps a first Serial Attached SCSI (SAS) address. In one embodiment the memory module further keeps a firmware which the storage control module executes to invoke the first SAS address to facilitate data communication. To invoke the first SAS address, in one embodiment the storage control module fetches a bit string from the memory module. The bit string is written into a data structure that is returned to the storage control module when it is determined that the bit string is a SAS address. In one embodiment the memory module further keeps a configuration file which the storage control module invokes to operate. The configuration file comprises a second SAS address, which is not invoked by the storage control module unless the bit string is not a SAS address.

15 Claims, 3 Drawing Sheets

STORAGE CONTROL DEVICES AND METHOD THEREFOR TO INVOKE ADDRESS THEREOF

CROSS-REFERENCE TO RELATED APPLICATIONS

This non-provisional application claims priority under 35 U.S.C. §119(a) on Patent Application No. 201410444086.7 filed in China, on Sep. 3, 2014, the entire contents of which are hereby incorporated by reference.

BACKGROUND OF THE INVENTION

Technical Field of the Invention

The present invention relates to a bus technology, particularly to storage control devices invoking the bus address thereof.

Description of the Related Art

The limitation of the bus technology forces storage servers to equip with storage control devices to manage numerous hard disk drives. A storage control device has an address of the bus. The address is usually assigned in the configuration file of the storage control device and burned into the storage control device with the configuration file, and is not separately changeable no matter the storage server is in the manufacturing process or in use. The address assignment and the burning process are complex and not easy to execute. For example, without opening up the case of the server, it is impossible to burn the configuration file through the Universal asynchronous receiver/transmitter (UART) of the storage control device.

SUMMARY OF THE INVENTION

According to the said problem, the present invention discloses several storage control devices and methods to invoke the address to simplify the modification of the bus address and reduce the possibility of mistakes made by operators and users.

The disclosed storage control device comprises a storage control module and a memory module. The storage control module is coupled between a central processing unit (CPU) and a plurality of hard disk drives. The memory module is coupled with the storage control module and comprises an address memory area and a firmware memory area. The address memory area is for storing a first Serial Attached SCSI (SAS) address of the storage control module. The firmware memory area is for storing a firmware of the storage control module. The firmware has an invoking unit. The storage control module is for executing the invoking unit to invoke the first SAS address to facilitate data communication.

In an embodiment, the memory module further comprises a configuration memory area, and the configuration memory area is for storing a configuration file of the storage control module, and the configuration file comprises a second SAS address, and the storage control module invokes the first SAS address from the memory module without invoking the second SAS address. In an embodiment, the second SAS address is a random or default SAS address.

In an embodiment, when the storage control module executes the invoking unit, the storage control module fetches a bit string from the address memory area, and fetching the bit string comprises selectively rearranging the bit string, and the storage control module determines whether the bit string is a SAS address, and when the bit string is a SAS address, the bit string is written into a data structure, and the data structure is returned to the storage control module. In an embodiment, when the bit string is not a SAS address, the second SAS address is written into the data structure and returned. In an embodiment, the data structure is a pointer provided by the storage control module, and writing the bit string into the data structure is writing the bit string into a memory area pointed by the pointer.

In an embodiment, when the storage control module fetches the bit string, the storage control module further obtains a buffer and writes the bit string into the buffer, and when the bit string is a SAS address, the bit string from the buffer is written into the data structure and the buffer is freed. In an embodiment, the buffer is located in the memory module.

In an embodiment, when updating the firmware, a new firmware is written into the firmware memory area and the first SAS address in the address memory area is unchanged. The new version firmware has another invoking unit. The storage control module is further used to execute the another invoking unit to invoke the first SAS address.

In an embodiment, the storage control module is a southbridge, SAS expander, or a Serial Advanced Technology Attachment (SATA) expander.

The disclosed another storage control device comprises a storage control module and a memory module. The storage control module is coupled between a CPU and a plurality of hard disk drives. The memory module is coupled with the storage control module and stores a configuration file, a firmware, and a first SAS address. The configuration file comprises a second SAS address, but the storage control module invokes the first SAS address from the memory module to facilitate data communication without invoking the second SAS address. In an embodiment, the second SAS address is a random or default SAS address.

In an embodiment, when updating the firmware, a new version firmware is written into the memory module and the first SAS address in the memory module is unchanged. The new version firmware has an invoking unit, and the storage control module is further used to execute the invoking unit to invoke the first SAS address.

The disclosed method is for a storage control device to invoke its first SAS address. The storage control device and the first SAS address are based on SAS. The storage control device comprises a storage control module and a memory module. In the said method, the storage control module fetches a bit string from an address memory area and determines whether the bit string is a SAS address. The address memory area is for storing the first SAS address. Fetching the bit string comprises selectively rearranging the bit string. When the bit string is a SAS address, the bit string is written into a data structure, and the data structure is returned to the storage control module.

In an embodiment, the configuration memory area of the memory module is for storing a configuration file of the storage control module. The configuration file comprises a random or default second SAS address. When the bit string is not a SAS address, the second SAS address is written into the data structure, and the data structure is returned to the storage control module.

In an embodiment, fetching the bit string further comprises obtaining a buffer and writing the bit string into the buffer. When the bit string is a SAS address, the bit string from the buffer is written into the data structure and the buffer is freed.

In an embodiment, the data structure is a pointer and writing the bit string into the data structure is writing the bit string into a memory area pointed by the pointer.

In summary, according to the present invention, the first SAS address, the configuration file, and the firmware are separated, and updating or modifying one of them does not interfere another two, but an invoking or backup relationship is existed among them. In different embodiments, invoking the first SAS address from the memory module can be implemented by call-by-value or call-by-reference.

The contents of the present invention set forth and the embodiments hereinafter are for demonstrating and illustrating the spirit and principles of the present invention, and for providing further explanation of the claims.

BRIEF DESCRIPTION OF THE DRAWINGS

The present invention will become more fully understood from the detailed description given hereinbelow and the accompanying drawings, which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
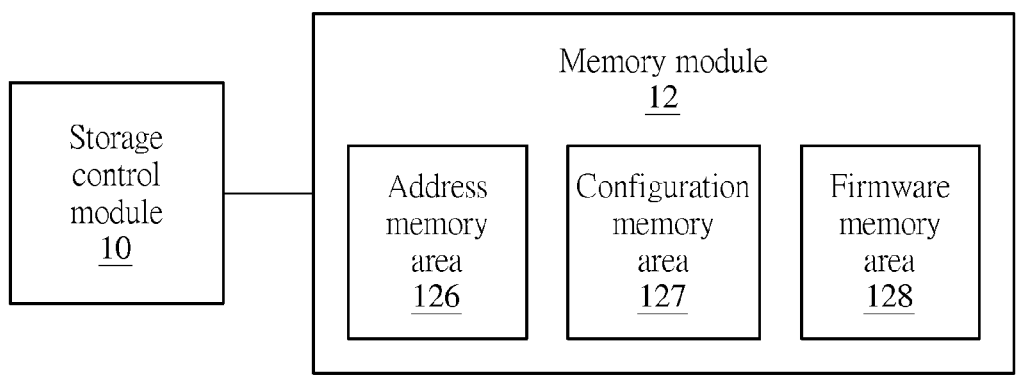
FIG. 1 is a diagram of a storage control device according to an embodiment of the present invention.

Please refer to FIG. 1. FIG. 1 is a diagram of a storage control device according to an embodiment of the present invention. As shown in FIG. 1, the storage control device 1 comprises a coupled storage control module 10 and a coupled memory module 12. In an embodiment, the storage control device 1 is based on Serial Attached SCSI (SAS), and the storage control module 10 is configured to a switch or a router to manage the expander or the port multiplier of a plurality of SAS equipments (such as hard disk drives). The storage control module 10 is coupled between a central processing unit (CPU) and a plurality of hard disk drives, for controlling the data communication between the CPU and the hard disk drives, or communication between the hard disk drives themselves. The storage control module 10 can be also based on the expander or the port multiplier of Serial Advanced Technology Attachment (SATA), or a circuit, on the mother board of the server, controlling the data transmission between the CPU and the peripheral storage devices, such as Input/Output Controller Hub, Platform Controller Hub, or southbridge. Practically, the said circuit can also be integrated into the general CPU.

In an embodiment, the memory module 12 stores the firmware (of the storage control module 10) and the configuration file. The concept of the operation of the storage control module 10 has two aspects, including dynamic part and static part. The dynamic part is that the storage control module 10 can execute the firmware and then has its function. The static part is that the storage control module 10 can load or invoke the configuration file. The bus address of the storage control device 1 which is needed according to the SAS communication and follows the SAS protocol is usually stored in the configuration file and then loaded. But the memory module 12 further stores an available second SAS address and the address that the configuration file may have is called the second SAS address. In an embodiment, the storage control module 10 invokes the first SAS address rather than the second address. Specifically, the partial codes, object codes, or machine codes of the firmware can be the invoking unit. When the storage control module 10 executes the firmware, the invoking unit is also executed accordingly (for example, during the initialization). Therefore, the storage control module 10 invokes the first SAS address from the memory module 12 to facilitate data communication.

The present invention does not limit how the memory module 12 stores data. For example, when the memory module 12 has a certain low-level file system, whoever accesses the memory module 12 does not need to understand the details of the hardware and only needs to, for example, indicate the file or data for invoking to the memory module 12 and received it from the memory module 12. The memory module 12 can also be divided to a plurality of memory area in advance and each memory area has its own purpose, such as storing specific information. In an embodiment, as shown in FIG. 1, the memory module 12 includes an address memory area 126, a configuration memory area 127, and a firmware memory area 128, for respectively storing the first SAS address, the configuration file, and the firmware. The storage control module 10 executes the firmware in the memory area 128 and invokes the first SAS address from the memory area 126 and the configuration file from the memory area 127, and ignores the second SAS address in the configuration file under normal situations. The configuration file and the firmware may need to be separately updated on an irregular basis, and the frequency of the former is higher than the latter. In an embodiment, when the new version configuration file is written in to the memory area 127, the first SAS address in the memory area 126 is unchanged, and the firmware in the memory area 128 is also possibly unchanged. The second SAS address in the different version of configuration file can be the same or different default or random SAS address. When the new version firmware is written into the memory area 128, the address memory area 126 is not affected, and the memory area 127 is possibly not affected. In an embodiment, the new version firmware also has an invoking unit and the codes are possibly different from the old version. The storage control module 10 can still invoke the first SAS address.

Figure 2:
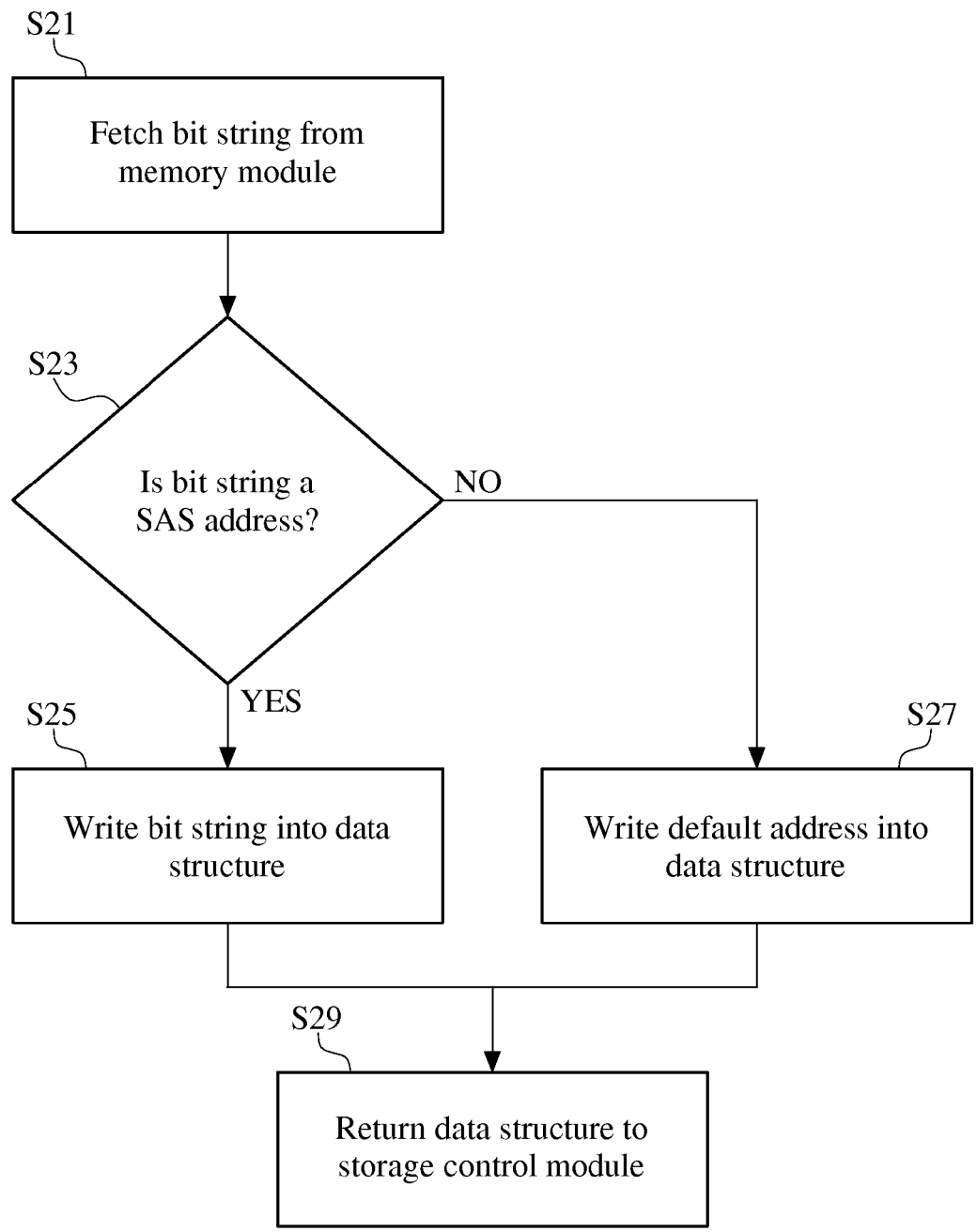
FIG. 2 and FIG. 3 are flowcharts of the storage control device invoking the first SAS address the according to different embodiments of the present invention.

In association with the detail of how the storage control module 10 invokes the first SAS address, please refer to FIG. 2. FIG. 2 is a flowchart of providing the storage control device to invoke the first SAS address the according to an embodiment of the present invention. As shown in FIG. 2, in the step S21, the storage control module 10 fetches a bit string from the memory area 126 of the memory module 12. Depending on the implementation of the memory module 12, the storage control module 10 may not need to know that the bit string is from the memory area 126, but the bit string may need to be rearranged to solve the endianness problem between the storage control module 10 and the memory module 12. Currently, the storage control module 10 cannot be certain about the received contents, so in the step S23, whether the bit string follows the SAS protocol and is an available address of SAS is determined. If the bit string does, then the bit string is the first SAS address and the storage control module 10 writes it into a certain data structure in the step S25. The data structure is returned in the step S29 and the storage control module 10 invokes the first SAS address successfully. Because the invoking unit is executed by the storage control module 10, practically, after the step S21, the bit string or the first SAS address is possibly only copied between the private scope of different functions, routines or methods in the internal memory of the storage control module 10, and finally the upper function, thread, or arithmetic circuit of the storage control module 10 (such as the CPU or the micro controller) invoking the invoking unit is allocated with a segment having the first SAS address as the data structure. In an embodiment, when the bit string does not follow the SAS protocol, the second SAS address in the configuration file is taken as the default value and written into the data structure in the step S27, so that the storage control device 1 or the storage control device 10 can still have a legal bus address.

Figure 3:
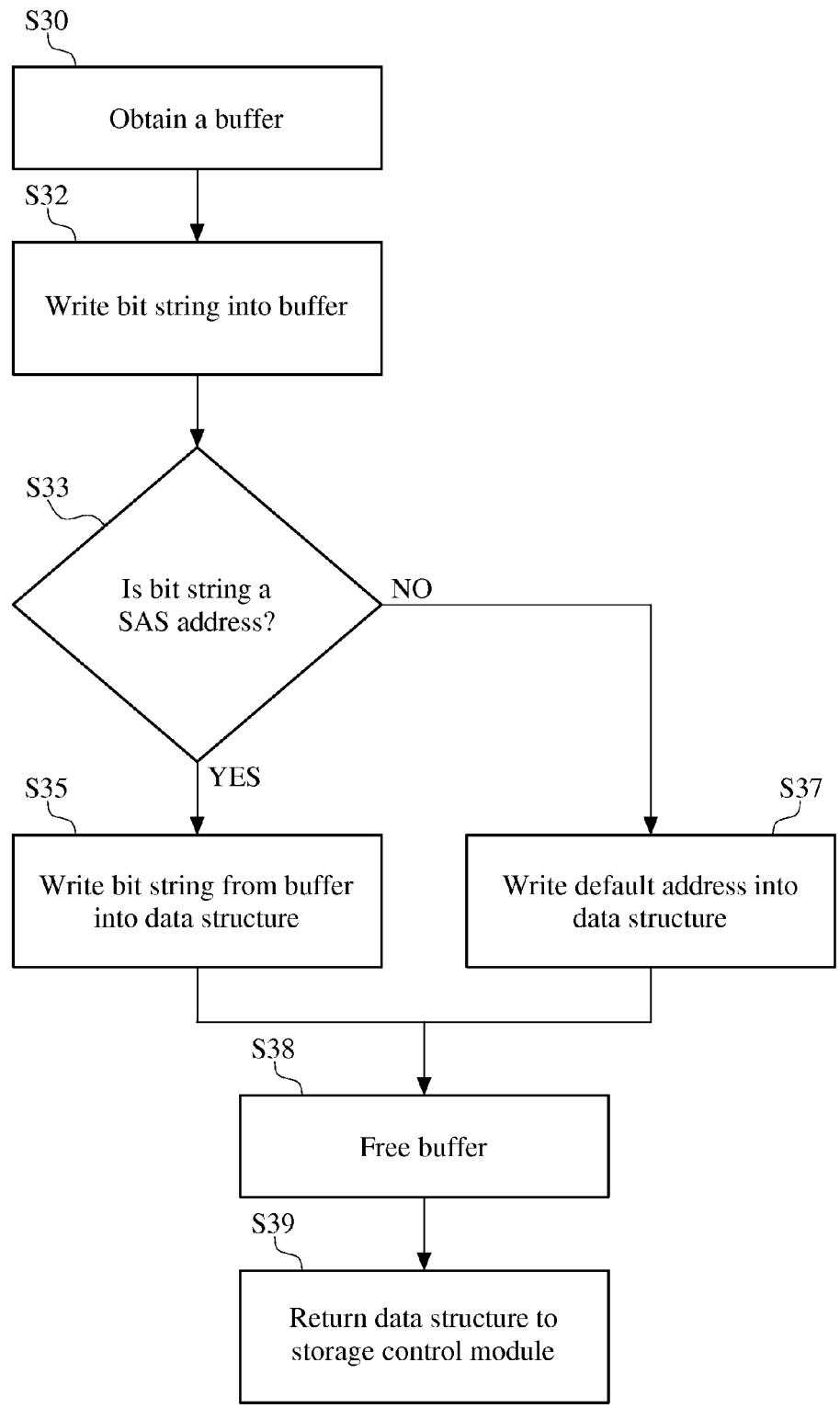

The hiding or non-indicative invoking method of the internal memory of the storage control module 10 is called call-by-value. When the invoking unit is adapted for a function and the parameters provided by the storage control module 10 include a pointer for returning and representing a certain memory address, please refer to FIG. 3 for the embodiment of the method implemented by call-by-reference. As shown in FIG. 3, in the step S30, the storage control module 10 applies for and obtains a segment of a certain memory (such as the internal memory of the storage control module 10 or the memory module 12) as a buffer. In the step S32, the fetched bit string (please refer to the step S21 in FIG. 2) is written into the buffer by the storage control module 10 or the called function. The storage control module 10 determines whether the bit string in the buffer follows the SAS protocol and is an available first SAS address (the step S33). If yes, then the bit string is written or copied to the data structure (the pointer) from the buffer in the step S35. Specifically, after the step S35, the memory area pointed by the pointer stores the first SAS address, and the invoking unit is adapted for the storage control module 10 to invoke the first SAS address through accessing the memory area by the pointer after the function is finished or returned. As the embodiment shown in FIG. 2, when the bit string does not follow the SAS protocol, the second SAS address in the configuration memory area 127 is taken as the default value and written into the memory area pointed by the pointer, so that the storage control device 1 or the storage control device 10 can still have a legal bus address. Because the buffer is a temporary working space for the storage control module 10 in the step S33, after the SAS address is written into the data structure in the step S35 or S37, the storage control module 10 frees the buffer in the step S38 for memory reuse. The present invention does not limit the order of the step S38 and the step S39.

Although the invoking unit is mentioned in the explanation of FIG. 2 and FIG. 3, please be noted that in practice, the firmware of the storage control module 10 is not necessarily highly modularized. In an embodiment, the function of the invoking unit can be scattered over many different places of the firmware, even be implemented by the hardware of the storage control module 10.

In summary, in the present invention, the firmware is for storage control module to execute and the storage control module receives the returned value or returned address to invoke another first SAS address stored by the memory module to facilitate data communication, unless the bit string fetched from the memory module, originally standing for the first SAS address, is not legal and the second SAS address possibly included in the configuration file is invoked. The first SAS address, the configuration file, and the firmware can be modified separately, and the manufacturing process, use, and maintenance of the storage control device of the server is divided and simplified.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments of the invention. It is intended, therefore, that the specification and examples be considered as exemplary only, with a true scope and spirit of the invention being indicated by the following claims and their full scope of equivalents.

What is claimed is:

1. A storage control device, comprising:
   a storage control module coupled between a central processing unit (CPU) and a plurality of hard disk drives; and
   a memory module coupled with the storage control module, comprising:
   an address memory area for storing a first Serial Attached SCSI (SAS) address of the storage control module; and
   a firmware memory area for storing a firmware of the storage control module;
   wherein the firmware has an invoking unit and the storage control module is for executing the invoking unit to invoke the first SAS address to facilitate data communication, when updating the firmware, a new firmware is written into the firmware memory area and the first SAS address in the address memory area is unchanged, and the new version firmware has another invoking unit, and the storage control module is further used to execute the another invoking unit to invoke the first SAS address.

2. The storage control device of claim 1, wherein the memory module further comprises a configuration memory area, and the configuration memory area is for storing a configuration file of the storage control module, and the configuration file comprises a second SAS address, and the storage control module invokes the first SAS address from the memory module without invoking the second SAS address.

3. The storage control device of claim 2, wherein the second SAS address is a random or default SAS address.

4. The storage control device of claim 1, wherein when the storage control module executes the invoking unit, the storage control module fetches a bit string from the address memory area, and fetching the bit string comprises selectively rearranging the bit string, and the storage control module determines whether the bit string is a SAS address, and when the bit string is a SAS address, the bit string is written into a data structure, and the data structure is returned to the storage control module.

5. The storage control device of claim 4, wherein the memory module further comprises a configuration memory area, and the configuration memory area is for storing a configuration file of the storage control module, and the configuration file comprises a random or default second SAS address, and when the bit string is not a SAS address, the second SAS address is written into the data structure, and the data structure is returned to the storage control module.

6. The storage control device of claim 4, wherein when the storage control module fetches the bit string, the storage control module further obtains a buffer and writes the bit string into the buffer, and when the bit string is a SAS address, the bit string from the buffer is written into the data structure and the buffer is freed.

7. The storage control device of claim 6, wherein the buffer is located in the memory module.

8. The storage control device of claim 4, wherein the data structure is a pointer provided by the storage control module, and writing the bit string into the data structure is writing the bit string into a memory area pointed by the pointer.

9. The storage control device of claim 4, wherein the storage control module is a southbridge, SAS expander, or a Serial Advanced Technology Attachment (SATA) expander.

10. A storage control device, comprising:
    a memory module storing a configuration file, a firmware, and a first SAS address; and
    a storage control module coupled with the memory module and coupled between a CPU and a plurality of hard disk drives, for executing the firmware and invoking the configuration file to operate;
    wherein the configuration file comprises a second SAS address, and the storage control module invokes the first SAS address from the memory module to facilitate data communication without invoking the second SAS address, when updating the firmware, a new version firmware is written into the memory module and the first SAS address in the memory module is unchanged, and the new version firmware has an invoking unit, and the storage control module is further used to execute the invoking unit to invoke the first SAS address.

11. The storage control device of claim 10, wherein the second SAS address is a random or default SAS address.

12. A method for a storage control device to invoke a first SAS address of the storage control device to facilitate data communication, the storage control device comprising a storage control module and a memory module, the method comprising:
    the storage control module fetching a bit string from an address memory area, wherein the address memory area is for storing the first SAS address, and the storage control device and the first SAS address are based on SAS; and
    the storage control module determining whether the bit string is a SAS address;
    wherein when the bit string is a SAS address, the bit string is written into a data structure, and the data structure is returned to the storage control module;
    wherein fetching the bit string comprises selectively rearranging the bit string.

13. The method of claim 12, wherein a configuration memory area of the memory module is for storing a configuration file of the storage control module, and the configuration file comprises a random or default second SAS address, and when the bit string is not a SAS address, the second SAS address is written into the data structure, and the data structure is returned to the storage control module.

14. The method of claim 12, wherein fetching the bit string further comprises:
    obtaining a buffer; and
    writing the bit string into the buffer;
    wherein when the bit string is a SAS address, the bit string from the buffer is written into the data structure and the buffer is freed.

15. The method of claim 12, wherein the data structure is a pointer and writing the bit string into the data structure is writing the bit string into a memory area pointed by the pointer.

* * * * *